(12) United States Patent
Svensson et al.

(10) Patent No.: US 11,161,381 B2
(45) Date of Patent: Nov. 2, 2021

(54) SELF-PROPELLED ROBOTIC LAWNMOWER COMPRISING WHEELS ARRANGED WITH A NEGATIVE CAMBER ANGLE

(71) Applicant: HUSQVARNA AB, Huskvarna (SE)

(72) Inventors: Mats Svensson, Huskvarna (SE); Rickard Ambros, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 107 days.

(21) Appl. No.: 16/487,273

(22) PCT Filed: Jan. 23, 2018

(86) PCT No.: PCT/SE2018/050047
§ 371 (c)(1),
(2) Date: Aug. 20, 2019

(87) PCT Pub. No.: WO2018/156064
PCT Pub. Date: Aug. 30, 2018

(65) Prior Publication Data
US 2020/0406697 A1 Dec. 31, 2020

(30) Foreign Application Priority Data
Feb. 21, 2017 (SE) .................................. 1750174-3

(51) Int. Cl.
*B60G 3/26* (2006.01)
*A01D 34/00* (2006.01)
(Continued)

(52) U.S. Cl.
CPC ............. *B60G 3/26* (2013.01); *A01D 34/008* (2013.01); *A01D 34/86* (2013.01);
(Continued)

(58) Field of Classification Search
CPC ............................ B60G 3/26; B60G 2200/46; B60G 2200/462; B60G 2200/464; A01D 34/008;
(Continued)

(56) References Cited

U.S. PATENT DOCUMENTS 2,245,821 A * 6/1941 Poynter .................. A01D 34/66
56/13.6
5,873,586 A 2/1999 Krimmell
(Continued)

FOREIGN PATENT DOCUMENTS

JP H01148623 A 6/1989
WO 2014/129941 A1 8/2014
(Continued)

OTHER PUBLICATIONS

Search Report for Swedish Application No. 1750174-3 dated Oct. 17, 2017.
(Continued)

*Primary Examiner* — James A English
*Assistant Examiner* — Kurtis Nielson
(74) *Attorney, Agent, or Firm* — Burr & Forman LLP

(57) ABSTRACT

Herein a self-propelled robotic lawnmower (1) Is disclosed comprising a lawnmower chassis (3.1, 3.2) and wheels (5.1-5.4) arranged at the lawnmower chassis (3.1, 3.2). The wheels (5.1-5.4) are arranged to support the lawnmower chassis (3.1, 3.2) during operation of the lawnmower (1). The wheels (5.1-5.4) comprise at least a first wheel (5,1) and a second wheel (S.2), wherein the first and second wheels (5.1, S.2) are arranged at opposite lateral sides (6.1, 6.2) of the lawnmower chassis (3.1, 3.2). At least the first and second wheels (5.1, 5.2) are arranged at the lawnmower chassis (3.1, 3.2) with a negative camber angle (a).

11 Claims, 2 Drawing Sheets

(51) Int. Cl.
*A01D 34/86* (2006.01)
*A01D 101/00* (2006.01)

(52) U.S. Cl.
CPC ...... *A01D 2101/00* (2013.01); *B60G 2200/46* (2013.01); *B60G 2200/462* (2013.01)

(58) Field of Classification Search
CPC .... A01D 34/86; A01D 2101/00; A01D 34/00; B62D 61/12
See application file for complete search history.

(56) References Cited

U.S. PATENT DOCUMENTS

| | | | |
|---|---|---|---|
| 2002/0070509 A1* | 6/2002 | Woo | B60G 3/26 280/5.521 |
| 2007/0260370 A1 | 11/2007 | Romig | |
| 2011/0148060 A1* | 6/2011 | Cutting | B60G 7/008 280/86.751 |
| 2014/0013721 A1 | 1/2014 | Paden | |
| 2015/0366130 A1* | 12/2015 | Bergstrom | B62D 11/001 701/23 |
| 2015/0373908 A1 | 12/2015 | Schulze Selting et al. | |
| 2017/0129297 A1* | 5/2017 | Bjorn | B60G 9/02 |
| 2017/0238460 A1* | 8/2017 | MacKean | A01D 34/008 |
| 2017/0361456 A1* | 12/2017 | He | B25J 5/00 |
| 2019/0054621 A1* | 2/2019 | MacKean | B25J 9/1697 |
| 2019/0160864 A1* | 5/2019 | Cmich | B60B 19/00 |
| 2019/0223376 A1* | 7/2019 | Lee | B25J 13/088 |
| 2019/0278269 A1* | 9/2019 | He | G05D 1/0022 |
| 2019/0297777 A1* | 10/2019 | Patel | A01D 34/66 |
| 2019/0380267 A1* | 12/2019 | Maggard | F16H 3/44 |

FOREIGN PATENT DOCUMENTS

| | | | | |
|---|---|---|---|---|
| WO | 2015/192900 A1 | 12/2015 | | |
| WO | WO-2015192900 A1 * | 12/2015 | ............ | B60L 3/0061 |
| WO | 2016/087998 A2 | 6/2016 | | |
| WO | WO-2019013013 A1 * | 1/2019 | ............... | B60C 7/00 |

OTHER PUBLICATIONS

International Search Report and Written Opinion for International Application No. PCT/SE2018/050047 dated Mar. 15, 2018.
International Preliminary Report on Patentability for International Application No. PCT/SE2018/050047 dated Aug. 27, 2019.

* cited by examiner

SELF-PROPELLED ROBOTIC LAWNMOWER COMPRISING WHEELS ARRANGED WITH A NEGATIVE CAMBER ANGLE

TECHNICAL FIELD

The present invention relates to a self-propelled autonomous robotic lawnmower.

BACKGROUND

Self-propelled robotic lawnmowers of different configurations are available on the market today which are capable of cutting grass in areas in an autonomous manner. Some robotic lawnmowers require a user to set up a border wire around a lawn that defines the area to be mowed. Such robotic lawnmowers use a sensor to locate the wire and thereby the boundary of the area to be trimmed. In addition to the wire, robotic lawnmowers may also comprise other types of positioning units and sensors, for example sensors for detecting an event, such as a collision with an object within the area.

A robotic lawnmower may comprise one or more batteries and one or more driving units being powered by the one or more batteries. Some robotic lawnmowers comprise a photovoltaic module arranged to generate electricity from the sun's rays which may fully or partially provide an energy source for charging the one or more batteries. The robotic lawnmower may move in a systematic and/or random pattern to ensure that the area is completely cut. In some cases, the robotic lawnmower uses the wire to locate a recharging dock used to recharge the one or more batteries.

Generally, robotic lawnmowers operate unattended within the area in which they operate. Many gardens have more or less slopes, cavities, etc. If the robotic lawnmower gets stuck in a steep slope, or stuck in a cavity, for example with one wheel in a cavity, the robotic lawnmower may empty its batteries in an attempt to get away. Operating in gardens having cavities, slopes and inclinations may thus pose a mobility problem for the robotic lawnmower.

In view of the above, there is room for improvements.

SUMMARY

It is an object of the present invention to provide a self-propelled autonomous robotic lawnmower with improved operational abilities.

According to an aspect of the invention, the object is achieved by a self-propelled autonomous robotic lawnmower comprising a lawnmower chassis and wheels arranged at the lawnmower chassis. The wheels are arranged to support the lawnmower chassis during operation of the lawnmower. The wheels comprise at least a first wheel and a second wheel, wherein the first and second wheels are arranged at opposite lateral sides of the lawnmower chassis. At least the first and second wheels are arranged at the lawnmower chassis with a negative camber angle.

Since the first and second wheels are arranged at the lawnmower chassis with a negative camber angle, the track gauge of the first and second wheels is widened as compared to a prior art robotic lawnmower. Thereby, the stability of the robotic lawnmower is improved, which reduces the risk of a rollover of the robotic lawnmower. In addition, lateral grip of the wheels may be improved which further reduces the risk of a rollover of the robotic lawnmower since a sliding in the lateral direction of the lawnmower may cause a rollover for example when one or more wheels of the lawnmower regains grip, or when the robotic lawnmower hits a stationary object. Further, due to the negative camber angle, centre of gravity of the robotic lawnmower may be lowered which also may increase the stability and may reduce the risk of a rollover of the robotic lawnmower.

In addition, since the first and second wheels are arranged at the lawnmower chassis with a negative camber angle, dimensions of an upper portion of the lawnmower chassis, as well as dimensions of an upper lawnmower housing, can be made smaller and thereby lighter. A smaller and lighter upper portion of the robotic lawnmower further contributes to an improved stability of the robotic lawnmower and a lowered centre of gravity, thus further reducing the risk of a rollover of the lawnmower. In addition, a smaller and lighter upper portion of the robotic lawnmower reduces a total weight of the lawnmower which improves terrain operating capabilities of the lawnmower, improves cornering capabilities of the lawnmower, as well as reduces wear on grass during operation of the lawnmower.

In addition, the widened track gauge of the first and second wheels provides conditions for the use of a larger cutting unit given the dimensions of the robotic lawnmower. Using a larger cutting unit improves the cutting result, as well as reduces the time required to cut a particular area.

Accordingly, a self-propelled autonomous robotic lawnmower is provided with improved operational abilities. As a result, the above-mentioned object is achieved.

Optionally, the negative camber angle is within a range of 0.5° to 10°, or within a range of 1° to 5°, or within a range of 2° to 3°. Thereby, a stable robotic lawnmower is provided while traction is ensured in a longitudinal direction of the lawnmower.

Optionally, the lawnmower comprises a first driving unit and a second driving unit, wherein the first driving unit is arranged to rotate the first wheel and the second driving unit is arranged to rotate the second wheel to propel the lawnmower during operation thereof, wherein the first driving unit is arranged at the lawnmower chassis in line with a rotational axis of the first wheel, and the second driving unit is arranged at the lawnmower chassis in line with a rotational axis of the second wheel. Since the first and second driving units are arranged at the lawnmower chassis in line with a rotational axis of a respective wheel being arranged at the lawnmower chassis with a negative camber angle, the first and second driving units are arranged at a respective mounting angle relative a horizontal plane of the lawnmower chassis, wherein the size of the respective mounting angle corresponds to a size of the camber angle. Since the camber angle is negative, each of the first and second driving units will be inclined downwards in relation to the horizontal plane of the lawnmower chassis. As a result, the centre of gravity of the robotic lawnmower is further lowered. Thereby, stability of the robotic lawnmower is even further improved.

Optionally, each of the first and second wheels comprises a rolling surface having an inner rolling circumference and an outer rolling circumference, wherein the outer rolling circumference is greater than the inner rolling circumference. Thereby, the contact surface between the rolling surface of the wheel and a ground surface on which the lawnmower is operating may be increased. As a result, traction in a longitudinal direction, as well as in lateral directions of the lawnmower may be improved.

Optionally, the rolling surface is arranged such that the angle between the rotational axis of the wheel and a line drawn across the rolling surface between the outer rolling circumference and the inner rolling circumference in a plane comprising the rotational axis of the wheel is within a range of 80% to 120% of the size of the negative camber angle. Thereby, traction in the longitudinal direction, as well as in lateral directions of the lawnmower is ensured.

Optionally, the lawnmower comprises three wheels arranged to support the lawnmower chassis during operation of the lawnmower. Thereby, a stable robotic lawnmower is provided, in which at least two wheels are arranged at the lawnmower chassis with a negative camber angle.

Optionally, the lawnmower comprises four wheels arranged to support the lawnmower chassis during operation of the lawnmower. Thereby, a stable robotic lawnmower is provided, in which at least two wheels are arranged at the lawnmower chassis with a negative camber angle.

Optionally, a third and a fourth wheel of the four wheels are arranged at opposite lateral sides of the lawnmower chassis, and wherein the third and the fourth wheels are arranged at the lawnmower chassis with a negative camber angle. Thereby, stability of the robotic lawnmower, as well as traction in the lateral direction of the lawnmower, is further improved since also the third and the fourth wheel are arranged at the lawnmower chassis with a negative camber angle. In addition, the widened track gauge provided by the negative camber angle of the third and fourth wheels provides conditions for the use of an even larger cutting unit given the dimensions of the robotic lawnmower.

Optionally, the lawnmower comprises a third driving unit and a fourth driving unit, wherein the third driving unit is arranged to rotate the third wheel and the fourth driving unit is arranged to rotate the fourth wheel to propel the lawnmower during operation thereof, wherein the third driving unit is arranged at the lawnmower chassis in line with a rotational axis of the third wheel, and the fourth diving unit is arranged at the lawnmower chassis in line with a rotational axis of the fourth wheel. Thereby, the centre of gravity of the robotic lawnmower is even further lowered which even further improves the stability of the robotic lawnmower. In addition, since the lawnmower comprises a third and a fourth driving unit arranged to rotate a respective wheel, the terrain operating capabilities of the robotic lawnmower is further improved, as well as the traction in the longitudinal direction of the lawnmower.

Optionally, each of the third and fourth wheels comprises a rolling surface having an inner rolling circumference and an outer rolling circumference, wherein the outer rolling circumference is greater than the inner rolling circumference. Thereby, the contact surface between the rolling surface of the wheel and a ground surface on which the lawnmower is operating may be increased. As a result, traction in a longitudinal direction, as wall as in lateral directions of the lawnmower may be further improved.

Optionally, the rolling surface is arranged such that the angle between the rotational axis of the wheel and a line drawn across the rolling surface between the outer rolling circumference and the inner rolling circumference in a plane comprising the rotational axis of the wheel is within a range of 80% to 120% of the size of the negative camber angle. Thereby, traction in the longitudinal direction, as well as in lateral directions of the lawnmower is further ensured.

Optionally, the lawnmower chassis comprises a first chassis portion and a second chassis portion, wherein the first and second wheels are arranged at the first chassis portion, and wherein the first chassis portion and the second chassis portion are pivotally arranged to each other to provide steering of the lawnmower. Thereby, steering is provided in a manner circumventing the need for an arrangement being configured to turn the wheels in relation to the lawnmower chassis. As a result thereof, steering of the robotic lawnmower is provided in a simple and efficient manner. As a further result, the robotic lawnmower can be provided in a cost-efficient manner.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
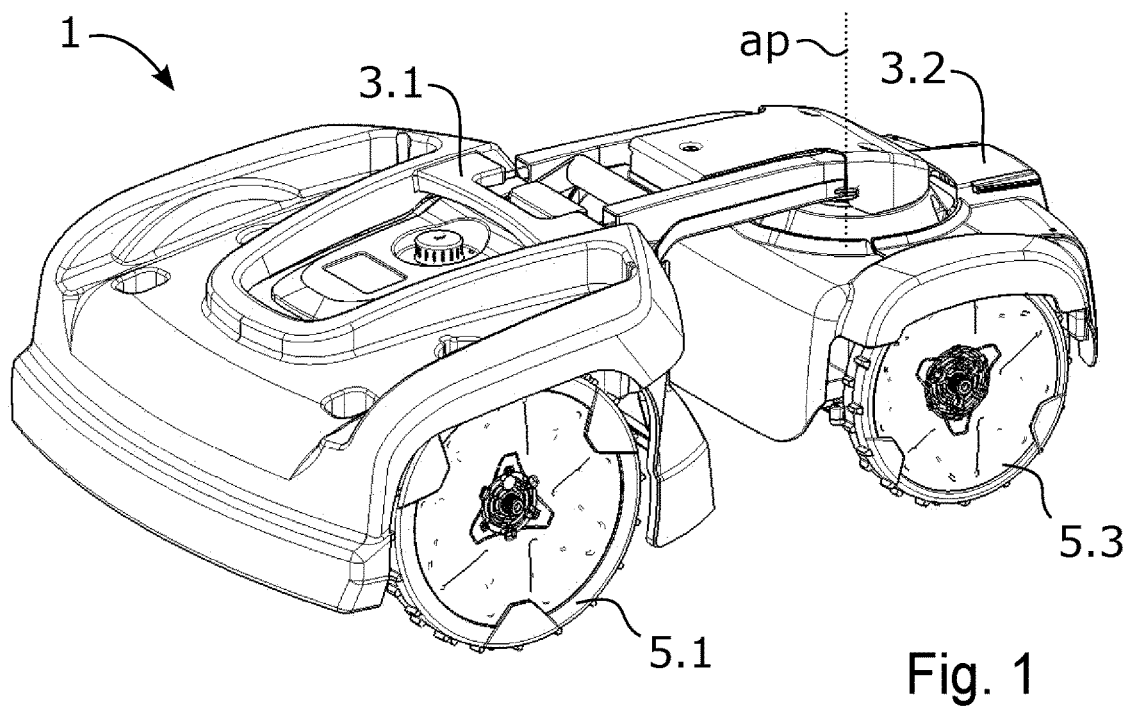
FIG. 1 illustrates a perspective view of a self-propelled robotic lawnmower, according to some embodiments.

FIG. 1 illustrates a perspective view of a self-propelled autonomous robotic lawnmower 1, according to some embodiments. The robotic lawnmower 1 comprises a lawnmower chassis 3.1, 3.2, which according to the illustrated embodiments comprises a first chassis portion 3.1 and a second chassis portion 3.2.

Figure 2:
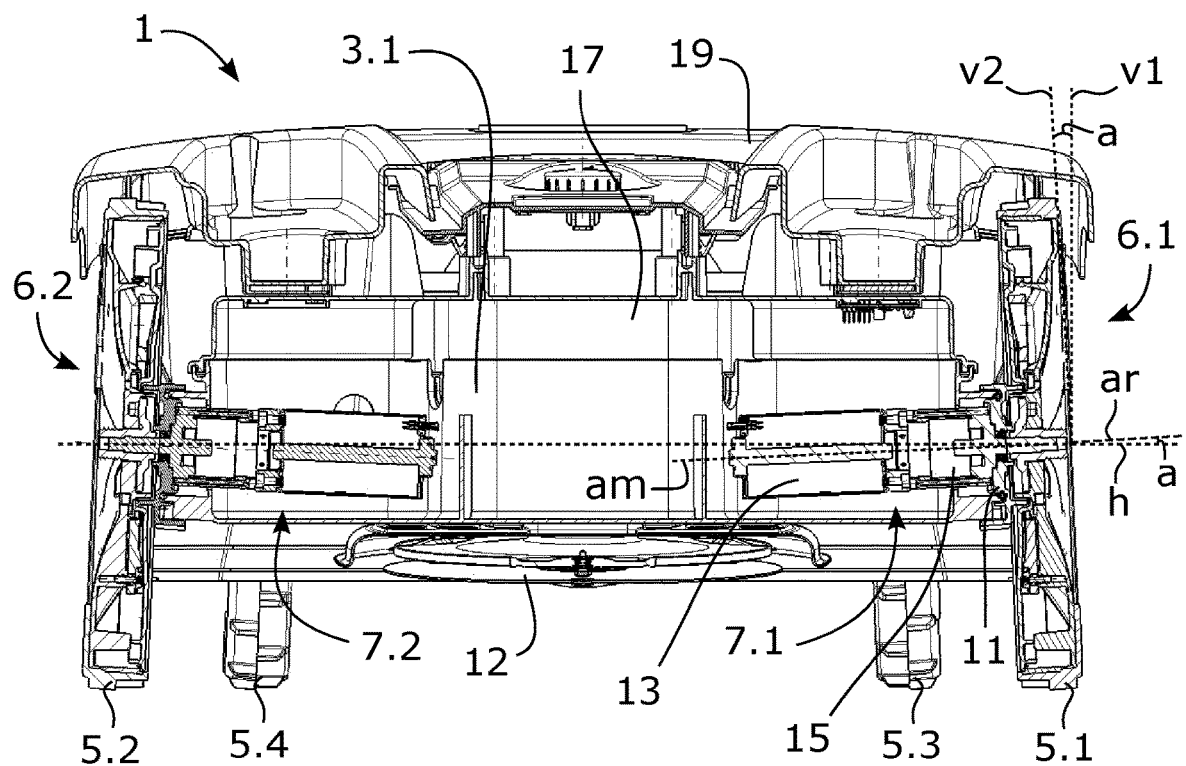
FIG. 2 illustrates a cross section of the robotic lawnmower illustrated in FIG. 1.

FIG. 2 illustrates a cross section of the robotic lawnmower 1 illustrated in FIG. 1. According to the illustrated embodiments, the lawnmower 1 comprises four wheels 5.1-5.4 arranged to support the lawnmower chassis 3.1, 3.2 during operation of the lawnmower 1. The cross section of FIG. 2 is through a respective rotational axis ar of a first wheel 5.1 and a second wheel 5.2. The first and second wheels 5.1, 5.2 are arranged at opposite lateral sides 6.1, 6.2 of the first chassis portion 3.1. That is, the first wheel 5.1 is arranged at a first lateral side 6.1 of the first chassis portion 3.1 and the second wheel 5.2 is arranged at a second lateral side 6.2 of the first chassis portion 3.1, wherein the second lateral side 6.2 is opposite to the first lateral side 6.1. A third and a fourth wheel 5.3, 5.4 of the four wheels 5.1-5.4 are arranged at opposite lateral sides 6.1, 6.2 of the second chassis portion 3.2, which second chassis portion 3.2 is visible in FIG. 1. The lawnmower may comprise another number of wheels and another design of the lawnmower chassis, as will be further discussed below. Lateral sides 6.1, 6.2 of the lawnmower 1 may be defined as sides 6.1, 6.2 of the lawnmower 1 having surface normals pointing in lateral directions of the lawnmower 1, i.e. In directions being essentially perpendicular to a longitudinal direction of the lawnmower 1. The longitudinal direction of the lawnmower 1 coincides with a direction of travel when the lawnmower 1 travels in a straight line. The lawnmower 1 comprises a cutting unit 12 configured to cut grass during operation of the lawnmower 1.

At least the first and second wheels 5.1, 5.2 are arranged at the lawnmower chassis 3.1, 3.2 with a negative camber angle a. Thereby, the stability of the lawnmower 1 is improved, the centre of gravity of the lawnmower 1 is lowered, the track gauge between the first and second wheels 5.1, 5.2 is widened and the traction in lateral directions of the lawnmower 1 is improved. Further, the widened track gauge of the first and second wheels 5.1, 5.2 provides conditions for the use of a larger cutting unit 12 given the dimensions of the robotic lawnmower 1. In the illustrated embodiments, also the third and the fourth wheels 5.3, 5.4 are arranged at the lawnmower chassis 3.1, 3.2 with a negative camber angle a, which further improves stability of the robotic lawnmower 1, further lowers the centre of gravity of the lawnmower 1 and further improves traction in lateral directions of the lawnmower 1. In addition, also the track gauge between the third and fourth wheels 5.3, 5.4 is widened which provides conditions for the use of an even larger cutting unit 12.

In the illustrated embodiments, the negative camber angle a is approximately 2.5° which provides a good stability while traction in the longitudinal direction of the lawnmower 1 is ensured, for example when the robotic lawnmower 1 is moving straight up a hill or slope. In further embodiments, the negative camber angle a may be within a range of 0.5° to 10°, or within a range of 1° to 8°, or within a range of 1.5° to 6°, or within a range of 1.5° to 5°, or within a range of 2° to 4°, or within a range of 2° to 3°. In still further embodiments, the negative camber angle a may be more than 10°, for example within a range of 10 to 20. However, a too great negative camber angle a may have a negative impact on the ground clearance and the traction between the wheels 5.1-5.4 and a ground surface in the longitudinal direction of the lawnmower 1.

When the robotic lawnmower 1 is positioned onto a flat surface, the horizontal axis h of the robotic lawnmower 1 is parallel to the flat surface onto which the lawnmower 1 is positioned. As indicated in FIG. 2, the negative camber angle a may be defined as the angle a between a rotational axis ar of the wheel 5.1 and the horizontal axis h of the robotic lawnmower 1. The negative camber angle a may thus be obtained by arranging a bearing 11 of the respective wheel 5.1 at an angle a relative the horizontal axis h of the robotic lawnmower 1 corresponding to the negative camber angle a. The camber angle a may further be measured between a vertical axis V2 of a wheel 5.1, i.e. an axis of the wheel being perpendicular to the axis of rotation, and the vertical axis V1 of the lawnmower 1 when viewed from the front or rear. The vertical axis V1 of the robotic lawnmower 1 is perpendicular to the horizontal axis h of the robotic lawnmower 1.

According to the illustrated embodiments, the lawnmower 1 comprises a first driving unit 7.1 and a second driving unit 7.2. The first driving unit 7.1 is arranged to rotate the first wheel 5.1 and the second driving unit 7.2 is arranged to rotate the second wheel 5.2 to propel the lawnmower 1 during operation of the lawnmower 1. Each driving unit 7.1, 7.2, may, as is illustrated in FIG. 2, comprise an electric motor 13 and a gear unit 15, such as a planetary gear unit, wherein the electric motor 13 is arranged to rotate the wheel 5.1 via the gear unit 15. As illustrated, the first driving unit 7.1 may be arranged at the lawnmower chassis 3.1 in line with a rotational axis ar of the first wheel 5.1, and the second driving unit 7.2 may be arranged at the lawnmower chassis 3.1 in line with a rotational axis of the second wheel 5.2. Thereby, the centre of gravity of the robotic lawnmower 1 is further lowered and a simple connection between the respective driving unit 7.1, 7.2, and the respective wheel 5.1, 5.2, can be provided. The feature that a driving unit 7.1 is arranged at the lawnmower chassis 3.1 in line with a rotational axis ar of a wheel 5.1, may, as is illustrated in FIG. 2, encompass that the driving unit 7.1 is arranged at the lawnmower chassis 3.1 such that a rotational axis am of a rotor of the electric motor 13 of the driving unit 7.1 substantially coincides with, and/or is substantially coaxially arranged to, the rotational axis ar of a wheel 5.1. Further, the feature that a driving unit 7.1, 7.2 is arranged at the lawnmower chassis 3.1 in line with a rotational axis ar of a wheel 5.1, 5.2, may encompass that the driving unit 7.1, 7.2 is arranged at the lawnmower chassis 3.1 such that a rotational axis am of the rotor of the motor 13 of the driving unit 7.1, 7.2 is substantially parallel to the rotational axis ar of a wheel 5.1, 5.2, e.g. such that the angle between the rotational axis am of the rotor of the motor 13 and the rotational axis ar of a wheel 5.1, 5.2 is less than 10 degrees, or less than 5 degrees. Further, the feature that a driving unit 7.1 is arranged at the lawnmower chassis 3.1 in line with a rotational axis ar of a wheel 5.1, may encompass that the driving unit 7.1 is substantially parallel to, and/or is substantially coaxially arranged to, the rotational axis ar of a wheel 5.1. As mentioned, each driving unit 7.1, 7.2, may comprise an electric motor 13 and a gear unit 15. According to such embodiments, the electric motor 13 and the gear unit 15 may be substantially parallel to, and/or substantially coaxially arranged to, the rotational axis ar of a wheel 5.1, 5.2.

Figure 3:
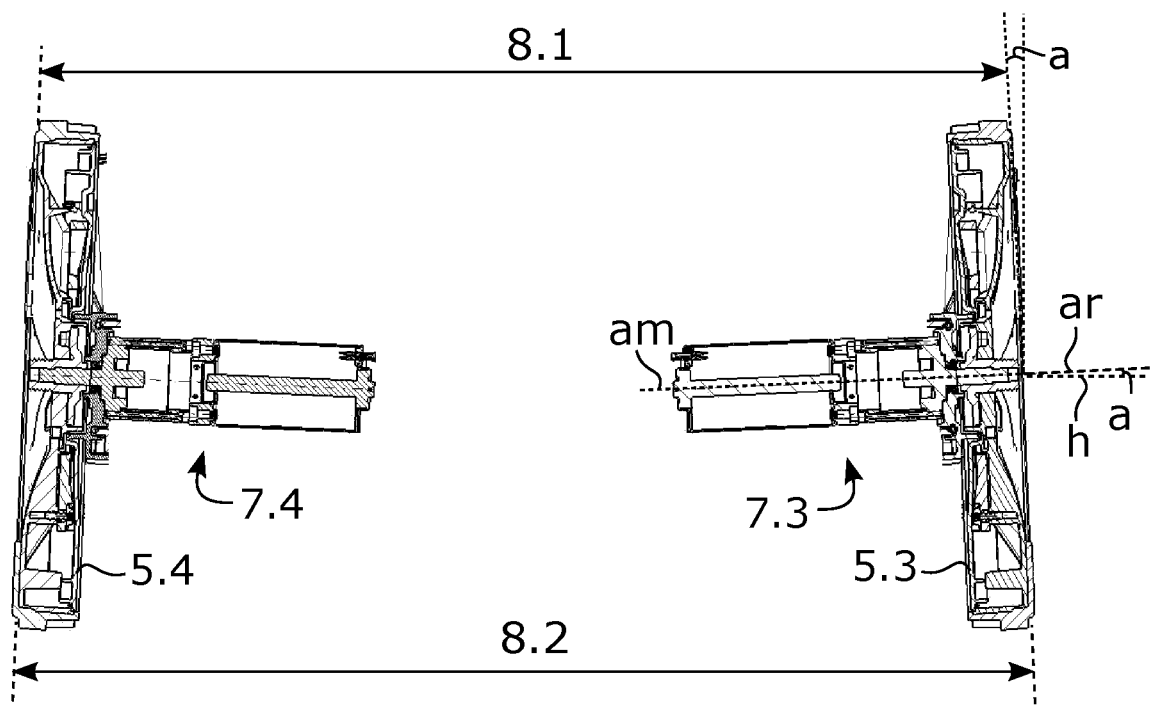
FIG. 3 illustrates a cross section of a third driving unit, a fourth driving unit, a third wheel and a fourth wheel of the robotic lawnmower illustrated in FIG. 1 and FIG. 2.

FIG. 3 illustrates a cross section of a third driving unit 7.3, a fourth driving unit 7.4, a third wheel 5.3 and a fourth wheel 5.4 of the lawnmower 1 illustrated in FIG. 1 and FIG. 2. The third driving unit 7.3 is arranged to rotate the third wheel 5.3 and the fourth driving unit 7.4 is arranged to rotate the fourth wheel 5.4 to propel the lawnmower during operation thereof. In FIG. 3, only the driving units 7.3, 7.4 and their respective wheel 5.3, 5.4 are illustrated, but they are illustrated in positions corresponding to mounting positions at the second chassis portion 3.2 of the lawnmower 1, as is illustrated in FIG. 1 and FIG. 2. As illustrated in FIG. 3, the third driving unit 7.3 is arranged in line with a rotational axis ar of the third wheel 5.3, and the fourth driving unit 7.4 is arranged in line with a rotational axis of the fourth wheel 5.4. Thereby, when the third and the fourth wheels 5.3, 5.4 are arranged at the second chassis portion 3.2 with a negative camber angle a, and the third and second driving units 7.3, 7.4 are arranged at the second chassis portion 3.2, the centre of gravity of the lawnmower 1 is further lowered.

FIG. 3 illustrates further advantages of at least two wheels being arranged at the lawnmower chassis with a negative camber angle a. As illustrated, the track gauge, i.e. the distance 8.2 between lowermost portions of the wheels 5.3, 5.4, is greater than the distance 8.1 between uppermost portions of the wheels 5.3, 5.4. The lowermost portions of the wheels 5.3, 5.4 are the portions of the wheels that abut against a ground surface during operation of the lawnmower. Due to the widened track gauge obtained by the negative camber angles a of the wheels 5.3, 5.4, the stability of the robotic lawnmower 1 is improved. In addition, due to the small distance 8.1 between the uppermost portions of the wheels 5.3, 5.4, an upper portion 17 of the lawnmower chassis 3.1 can be made smaller and lighter, as well as an upper housing 19 of the robotic lawnmower 1, as is illustrated in FIG. 2. Thereby, the centre of gravity of the lawnmower 1 can be even further lowered which further improves stability of the lawnmower 1. In addition, a smaller and lighter upper body of the lawnmower 1 improves cornering capabilities of the lawnmower 1, especially in confined spaces. In addition, a smaller and lighter upper body of the lawnmower 1 reduces a low total weight of the lawnmower 1 which further improves terrain operating capabilities of the lawnmower 1, and reduces wear on grass during operation of the lawnmower 1.

Figure 4:
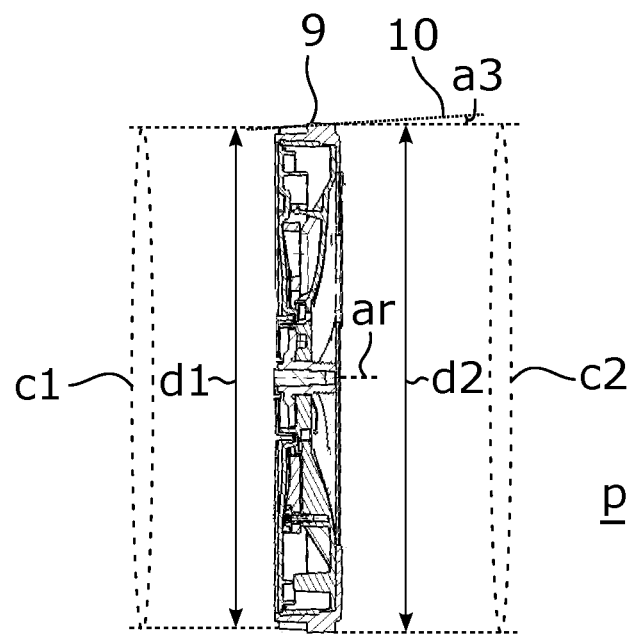
FIG. 4 illustrates a cross section of a wheel of the lawnmower illustrated in FIG. 1 and FIG. 2

FIG. 4 illustrates a cross section of a wheel 5.1-5.4 of the lawnmower 1 illustrated in FIG. 1 and FIG. 2. The wheel 5.1-5.4 illustrated may be any of the first, the second, the third or the fourth wheel 5.1-5.4. The cross section of the wheel 5.1-5.4 is illustrated in a plane p comprising the rotational axis ar of the wheel 5.1-5.4.

The wheel 5.1-5.4 comprises a rolling surface 9 having an inner rolling circumference c1 and an outer rolling circumference c2. The rolling surface 9 of the wheel 5.1-5.4 is the surface of the wheel 5.1-5.4 having contact with the ground surface during rotation of the wheel 5.1-5.4 upon operation of the lawnmower. When the wheel 5.1-5.4 is arranged at the lawnmower, the inner rolling circumference c1 is closer to the lawnmower chassis than the outer rolling circumference c2. In the illustrated embodiments, the outer rolling circumference c2 is greater than the inner rolling circumference c1. Thereby, the effects of the negative camber angle on the contact surface between the wheel 5.1-5.4 and the ground surface are compensated for and the contact surface between the rolling surface of the wheel 5.1-5.4 and a ground surface on which the lawnmower is operating may be increased. As a result, traction in a longitudinal direction, as well as in lateral directions of the lawnmower may be further improved.

The inner rolling circumference c1 may be defined as the annular circumference of an inner edge of the rolling surface 9, wherein the inner edge is the portion of the rolling surface 9 being closest to the lawnmower chassis, when the wheel 5.1-5.4 is arranged at the lawnmower chassis. The outer rolling circumference c2 may be defined as the annular circumference of an outer edge of the rolling surface 9, wherein the outer edge is the portion of the rolling surface 9 being furthest away from the lawnmower chassis, when the wheel 5.1-5.4 is arranged at the lawnmower chassis. As illustrated in FIG. 4, the wheel 5.1-5.4 has an inner rolling diameter d1, measured at the inner edge of the rolling surface 9, and an outer rolling diameter d2, measured at the outer edge of the rolling surface 9. The size of the inner rolling circumference c1 may be obtained by multiplying the size of the inner rolling diameter d1 with the number $\pi$. Likewise, the size of the outer rolling circumference c2 may be obtained by multiplying the size of the outer rolling diameter d2 with the number $\pi$.

According to the illustrated embodiments, the rolling surface 9 is arranged such that the angle a3 between the rotational axis ar of the wheel 5.1-5.4 and a line 10 drawn across the rolling surface 9 between the outer rolling circumference c2 and the inner rolling circumference c1 in the plane p comprising the rotational axis ar of the wheel 5.1-5.4 essentially corresponds to the size of the negative camber angle a. Thereby, the effects of the negative camber angle on the contact surface between the wheel 5.1-5.4 and the ground surface are essentially completely compensated for and the contact surface between the rolling surface of the wheel 5.1-5.4 and a ground surface on which the lawnmower is operating may due to these features be optimized. As a result, traction in the longitudinal direction, as wed as in lateral directions, of the lawnmower may be further improved.

The rolling surface 9 may be arranged such that the angle a3 between the rotational axis ar of the wheel 5.1-5.4 and the line 10 drawn across the rolling surface 9 between the outer rolling circumference c2 and the inner rolling circumference c1 in the plane p comprising the rotational axis ar of the wheel 5.1-5.4 is within a range of 80% to 120%, or within a range of 90% to 110%, or within a range of 95% to 105%, of the size of the negative camber angle a. Thereby, traction in the longitudinal direction, as well as in lateral directions, of the lawnmower is ensured.

According to some embodiments, such that the embodiments illustrated in FIG. 1 and FIG. 2, the lawnmower 1 is designed such that a weight distribution of the lawnmower 1 is approximately 50% at the wheels 5.3, 5.4 arranged in the front of the lawnmower 1 and 50% at the wheels 5.1, 5.2 arranged in the rear of the lawnmower 1. The lawnmower 1 may be designed such that a weight distribution of the lawnmower 1 is approximately 40% to 60% at the wheels 5.3, 5.4 arranged in the front of the lawnmower 1 and 40% to 60% at the wheels 5.1, 5.2 arranged in the rear of the lawnmower 1. Thereby, an essentially equal weight distribution between the wheels 5.1-5.4 is provided which further improves the stability, as well as the terrain operating capabilities of the lawnmower 1, while wear on the grass during operation of the lawnmower 1 is reduced.

The lawnmower 1 may comprise one or more batteries and a control unit, wherein the one or more batteries are arranged to supply electricity to the driving units 7.1-7.4, by an amount controlled by the control unit. The lawnmower 1 may further comprise one or more sensors arranged to sense a magnetic field of a wire, and/or one or more positioning units and/or one or more sensors arranged to detect an impending or ongoing collision event with an object. In addition, the lawnmower 1 may comprise a communication unit connected to the control unit. The communication unit may be configured to communicate with a remote communication unit to receive instructions therefrom and/or to send information thereto. The communication may be performed wirelessly over a wireless connection such as the internet, or a wireless local area network (WLAN), or a wireless connection for exchanging data over short distances using short-wavelength, i.e. ultra-high frequency (UHF) radio waves in the industrial, scientific and medical (ISM) band from 2.4 to 2.485 GHz. As mentioned, the lawnmower 1, as referred to herein, is a self-propelled autonomous robotic lawnmower 1 which means that the lawnmower 1 is able to perform cutting without a need for human control or intervention under a range of situations and conditions. The self-propelled autonomous robotic lawnmower 1 may navigate by a computer, using input values obtained from one or more sensors, such as one or more of the above-mentioned types, to perform cutting without a need for human control or intervention. Such a computer may be arranged in the lawnmower 1, for example in the control unit thereof, or at an external location.

According to the embodiments of the lawnmower 1 illustrated in FIG. 1 and FIG. 2, the lawnmower chassis 3.1, 3.2 comprises a first chassis portion 3.1 and a second chassis portion 3.2, wherein the first and second wheels 5.1, 5.2 are arranged at the first chassis portion 3.1, and wherein the third and fourth wheels 5.3, 5.4 are arranged at the second chassis portion 3.2. Further, according to these embodiments, the first chassis portion 3.1 and the second chassis portion 3.2 are pivotally arranged to each other in a pivot axis ap to provide steering of the lawnmower 1. The lawnmower 1 may comprise a motor (not illustrated) arranged to, upon control of the control unit, turn the first and second chassis portions 3.1, 3.2 relative each other to steer the lawnmower 1. As an alternative or in addition, the control unit may be configured to steer the lawnmower 1 by selectivity controlling torque and/or rotational speed of driving units 7.1-7.4 at different lateral sides 6.1, 6.2 of the lawnmower 1. In such embodiments, the lawnmower 1 will turn to the left if driving units 7.1, 7.3 on a right side of the lawnmower 1 is controlled to a higher torque and/or rotational speed than driving units 7.2, 7.4 on the left side of the lawnmower 1, and vice versa. According to further embodiments, the lawnmower comprises four wheels 5.1-5.4 arranged at a coherent lawnmower chassis, where steering is provided by selectivity controlling torque and/or rotational speed of driving units 7.1-7.4 at different lateral sides 6.1, 6.2 of the lawnmower 1.

According to still further embodiments, the lawnmower may comprise three wheels arranged at a lawnmower chassis, wherein the three wheels are arranged to support the lawnmower chassis during operation of the lawnmower. In such embodiments, two of the three wheels are arranged at opposite lateral sides of the lawnmower chassis and are arranged at the lawnmower chassis with a negative camber angle a. The third wheel may be positioned at a rear of the lawnmower 1, regarding the intended forward direction of travel of the lawnmower 1, or may be positioned in the front of the lawnmower 1, regarding the intended forward direction of travel of the lawnmower 1. Also in such embodiments, steering may be provided by controlling torque and/or rotational speed of driving units configured to rotate the two wheels that are arranged at opposite lateral sides of the lawnmower chassis.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims. For instance, two or more wheels of the robotic lawnmower 1 may be arranged at the lawnmower chassis 3.1, 3.2 with the same negative camber angle a, or with different negative camber angles. For example, the first and second wheels 5.1, 5.2 may be arranged at the lawnmower chassis 3.1, 3.2 with a first negative camber angle, and the third and the fourth wheel 5.3, 5.4 may arranged at the lawnmower chassis 3.1, 3.2 with a second negative camber angle, wherein the second negative camber angle is greater or smaller than the first negative camber angle.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A self-propelled robotic lawnmower comprising a lawnmower chassis and wheels arranged at the lawnmower chassis, wherein the wheels are arranged to support the lawnmower chassis during operation of the lawnmower, and wherein the wheels comprise at least a first wheel and a second wheel, wherein the first and second wheels are arranged at opposite lateral sides of the lawnmower chassis,
   wherein at least the first and second wheels are arranged at the lawnmower chassis with a negative camber angle;
   wherein the lawnmower comprises a first driving unit and a second driving unit, wherein the first driving unit is arranged to rotate the first wheel and the second driving unit is arranged to rotate the second wheel to propel the lawnmower during operation thereof, wherein the first driving unit is arranged at the lawnmower chassis in line with a rotational axis of the first wheel, and the second driving unit is arranged at the lawnmower chassis in line with a rotational axis of the second wheel.

2. The lawnmower according to claim 1, wherein the negative camber angle is within a range of 0.5° to 10°, or within a range of 1° to 5°, or within a range of 2° to 3°.

3. The lawnmower according to claim 1, wherein the lawnmower comprises four wheels arranged to support the lawnmower chassis during operation of the lawnmower.

4. The lawnmower according to claim 3, wherein a third and a fourth wheel of the four wheels are arranged at opposite lateral sides of the lawnmower chassis, and wherein the third and the fourth wheels are arranged at the lawnmower chassis with a second negative camber angle.

5. The lawnmower according to claim 4, wherein the lawnmower comprises a third driving unit and a fourth driving unit, wherein the third driving unit is arranged to rotate the third wheel and the fourth driving unit is arranged to rotate the fourth wheel to propel the lawnmower during operation thereof, wherein the third driving unit is arranged at the lawnmower chassis in line with a rotational axis of the third wheel, and the fourth driving unit is arranged at the lawnmower chassis in line with a rotational axis of the fourth wheel.

6. The lawnmower according to claim 4, wherein the third and fourth wheels are arranged at a second chassis portion.

7. The lawnmower according to claim 1, wherein the lawnmower chassis comprises a first chassis portion and a second chassis portion, wherein the first and second wheels are arranged at the first chassis portion, and wherein the first chassis portion and the second chassis portion are pivotally arranged to each other to provide steering of the lawnmower.

8. A self-propelled robotic lawnmower comprising a lawnmower chassis and wheels arranged at the lawnmower chassis, wherein the wheels are arranged to support the lawnmower chassis during operation of the lawnmower, and wherein the wheels comprise at least a first wheel and a second wheel, wherein the first and second wheels are arranged at opposite lateral sides of the lawnmower chassis,
   wherein at least the first and second wheels are arranged at the lawnmower chassis with a negative camber angle;
   wherein each of the first and second wheels comprises a rolling surface having an inner rolling circumference and an outer rolling circumference, wherein the outer rolling circumference is greater than the inner rolling circumference.

9. The lawnmower according to claim 8, wherein the rolling surface is arranged such that an angle between a rotational axis of the first wheel and a line drawn across the rolling surface between the outer rolling circumference and the inner rolling circumference in a plane comprising the rotational axis of the first wheel is within a range of 80% to 120% of a size of the negative camber angle.

10. A self-propelled robotic lawnmower comprising a lawnmower chassis and wheels arranged at the lawnmower chassis, wherein the wheels are arranged to support the lawnmower chassis during operation of the lawnmower, and wherein the wheels comprise at least a first wheel and a second wheel, wherein the first and second wheels are arranged at opposite lateral sides of the lawnmower chassis,
   wherein at least the first and second wheels are arranged at the lawnmower chassis with a negative camber angle;

wherein the lawnmower comprises four wheels arranged to support the lawnmower chassis during operation of the lawnmower;

wherein a third and a fourth wheel of the four wheels are arranged at opposite lateral sides of the lawnmower chassis, and wherein the third and the fourth wheels are arranged at the lawnmower chassis with a second negative camber angle;

wherein each of the third and fourth wheels comprises a rolling surface having an inner rolling circumference and an outer rolling circumference, wherein the outer rolling circumference is greater than the inner rolling circumference.

11. The lawnmower according to claim 10, wherein the rolling surface is arranged such that an angle between a rotational axis of the third wheel and a line drawn across the rolling surface between the outer rolling circumference and the inner rolling circumference in a plane comprising the rotational axis of the third wheel is within a range of 80% to 120% of a size of the negative camber angle.

\* \* \* \* \*